Jan. 28, 1969   J. C. BROWN   3,424,491

SUN VISOR

Filed May 6, 1966

INVENTOR
JOSEPH CECIL BROWN
BY
Whittemore, Hulbert & Belknap
ATTORNEYS

United States Patent Office 3,424,491
Patented Jan. 28, 1969

3,424,491
SUN VISOR
Joseph Cecil Brown, Loughton, England, assignor to Homerton Engineering Company Limited, London, England, a British company
Filed May 6, 1966, Ser. No. 548,238
Claims priority, application Great Britain, May 13, 1965, 20,230/65
U.S. Cl. 296—97　　　　　　　　　　2 Claims
Int. Cl. B60j 3/02

ABSTRACT OF THE DISCLOSURE

The invention relates to a mounting for a sun visor and comprises a frame formed from a resilient metal strip bent to conform to the outline of the visor and being deformable upon impact by the head of a person.

---

This invention relates to sun visors for motor vehicles. It is a major object of the invention to provide a sun visor which is made in such a way that it is of less danger to a driver or passenger than known forms of sun visors which are entirely rigid.

According to the present invention, there is provided a sun visor for a motor vehicle comprising a rigid spine member adapted for mounting on the vehicle, and a frame member on said spine member so constructed as to be resiliently deformable in the plane of the visor.

In order that the invention shall be clearly understood an exemplary embodiment thereof will now be described with reference to the accompanying drawings wherein.

Figure 1:
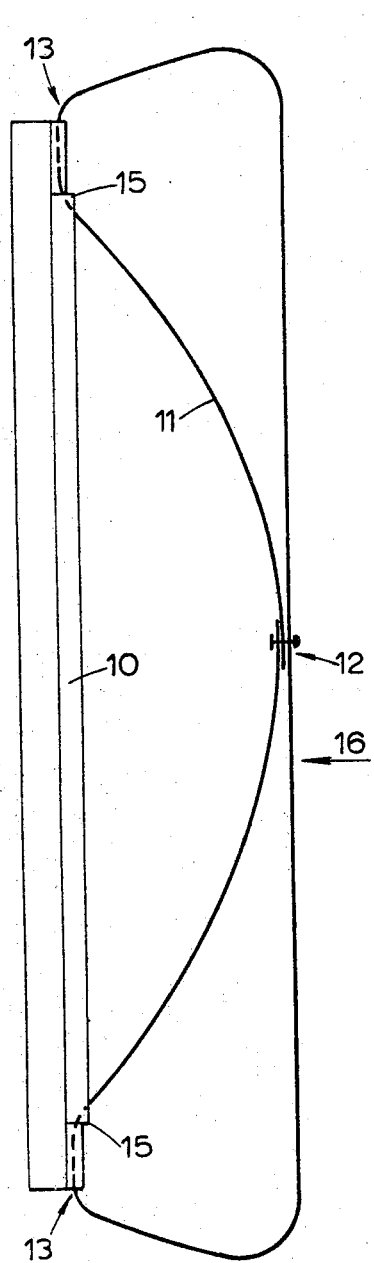
FIGURE 1 shows a plan view of a framework for the sun visor.
Figure 2:
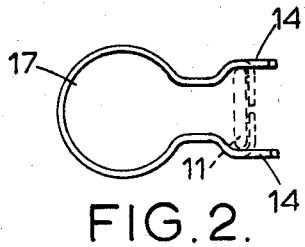
FIGURE 2 shows an end view of the main structural member of the framework.

In FIGURE 1, the sun visor framework comprises a rigid main structural or spine member 10, which is attached at one end to a mounting, and a thin metal frame member 11. The main structural member 10 is of aluminium, although it may be any other suitable material such as mild steel, and has a cross-section as shown in FIGURE 2 in full lines. The frame member 11 is in this instance formed from a single length into a sinuous shape somewhat like an 8. The two ends are brought together at the centre 12 and rivetted. The material for the member 11 is a thin spring steel strip, approximately ¼" x ¹⁄₃₂", seen edge-on in FIGURE 1.

The member 11 is fixed to the member 10 at each end 13 by cutting the arms 14 of the cross-section at 15 and bending the arms inwardly, as shown dotted in FIGURE 2. The visor can be mounted on the rod-like arm of a mounting bracket by forcing the arm into aperture 17.

A framework constructed as above has the considerable advantage that while normally quite stiff, any force applied in the direction of the arrow 16 simply causes the member 11 to buckle inwardly in the plane of the visor. Thus, in its normal stowed position in a car, parallel with the roof and projecting backwards, it does not form a hazard for a passenger in an accident or upon sudden deceleration. A conventional, rigid sun visor can do great damage to the human head, but a visor as described above simply gives way. However, no permanent damage is done to the sun visor either, since the frame 11 will simply spring back into shape.

It would seem that the shape shown for member 11 is not the only one which might be chosen, other sinuous shapes being equally effective for permitting buckling and subsequent recovery of shape.

Equally, metal strip is not the only material possible; bamboo or plastic might be used.

The framework is, of course, covered with leather or a plastic material, and is preferably covered with a foam plastics material. In the latter case, however, since the member 11 on recovery from distortion tends to catch on the foam surface and to tear it, the frame may first be covered with sheet polythene, for example, simply by insertion in a polythene bag.

It should also be noted that the steel strip need not be of the particular dimensions given, a thinner strip being capable of use so long as it provides the necessary rigidity. The less metal used, the cheaper the visor is to manufacture. With a smaller cross-section, some modification of the fixing at points 13 may be necessary.

Figure 3:
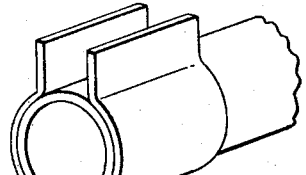
FIGURES 3 to 6 show different methods of attaching the frame member to the main structural member.
Figure 4:
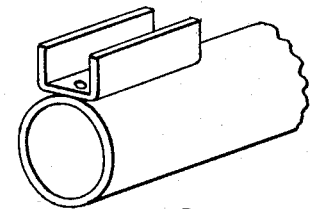
Figure 5:
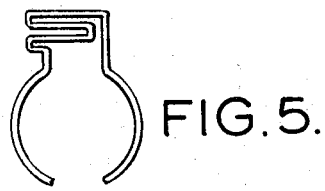

Various alternative methods of fixing are shown in FIGURES 3 to 6. In FIGURE 3, the main structural member is a tube 18, to which a saddle member 20 is applied. The member 11 is fixed by insertion between the arms 21 which are then bent over to hold it firm. In FIGURE 4, a U-section member 22 is spot welded to a tube 18, and the member 11 is then fixed in the same manner. FIGURE 5 shows a different form of saddle clip, which provides a U-section portion 23, applied to a hollow tube 18.

Figure 6:
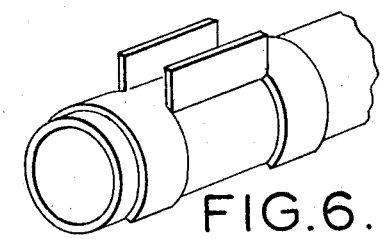

In FIGURE 6, a rather more complex tube section is shown which provides a jaw 24 into which the member 11 can be inserted. The latter is fixed by clamping the jaw together.

All these latter alternatives provide a main structural member which does not have frontwardly projecting sharp edges over its whole length, as does that shown in FIGURE 2.

As a further alternative, the member 11 might be simply spot welded or glued to a plain tube forming the structural member 10.

I claim:
1. A mounting for a sun visor comprising in combination a tubular member and a resilient frame, said frame being formed from a single strip of metal having a front portion and having a rearwardly angular bent portion at each end of said front portion, said bent portions being further bent longitudinally of said front portion to dispose the terminal ends of said strip rearwardly of said front portion and in overlapping relation, said terminal ends being secured to said front portion and to each other intermediate the ends of said front portion, said tubular member being provided at each end thereof with spaced arms, said longitudinally bent portions being secured between said spaced arms, said tubular member, said front portion and said rearwardly angular bent portions constituting an assembled mounting conforming to the outline of the visor.

2. A mounting for a sun visor as defined in claim 1, said spaced arms being integral with said tubular member.

References Cited

UNITED STATES PATENTS 2,844,200　7/1958　Herr et al. _____ 296—97
3,193,323　7/1965　Herr et al. _____ 296—97

FOREIGN PATENTS 1,069,014　11/1959　Germany.

BENJAMIN HERSH, Primary Examiner.

L. D. MORRIS, JR., Assistant Examiner.